US008180043B2

(12) United States Patent
Dezonno et al.

(10) Patent No.: US 8,180,043 B2
(45) Date of Patent: May 15, 2012

(54) METHOD AND APPARATUS FOR CUSTOMER KEY ROUTING

(75) Inventors: Anthony J. Dezonno, Bloomingdale, IL (US); Roger A. Sumner, Batavia, IL (US); Sandy Biggam, Bloomingdale, IL (US); Jeffrey D. Hodson, Wheaton, IL (US); Mary Ellen Moser, Warrenville, IL (US); Mike Hollatz, Huntley, IL (US); Dave Wesen, Channahon, IL (US); Michael Sheridan, Oak Park, IL (US)

(73) Assignee: Aspect Software, Inc., Lombard, IL (US)

( * ) Notice: Subject to any disclaimer, the term of this patent is extended or adjusted under 35 U.S.C. 154(b) by 1047 days.

(21) Appl. No.: 11/006,151

(22) Filed: Dec. 7, 2004

(65) Prior Publication Data
US 2008/0008309 A1    Jan. 10, 2008

(51) Int. Cl.
H04M 3/00    (2006.01)
(52) U.S. Cl. ......... 379/265.11; 379/265.12; 379/265.13; 379/266.01; 379/266.02
(58) Field of Classification Search ............. 379/265.02, 379/265.1, 265.05, 265.11, 265.12, 266, 379/265.13, 266.01, 266.02
See application file for complete search history.

(56) References Cited

U.S. PATENT DOCUMENTS

| | | |
|---|---|---|
| 5,555,179 A | 9/1996 | Koyama et al. |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,287 B1 * | 2/2001 | Miloslavsky ................. 379/219 |
| 6,185,292 B1 | 2/2001 | Miloslavsky |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,389,400 B1 * | 5/2002 | Bushey et al. .................... 705/7 |
| 6,393,015 B1 | 5/2002 | Shtivelman |
| 6,408,066 B1 * | 6/2002 | Andruska et al. ........ 379/265.12 |
| 6,493,695 B1 * | 12/2002 | Pickering et al. ............... 706/47 |
| 6,704,410 B1 * | 3/2004 | McFarlane et al. ...... 379/265.05 |
| 6,732,156 B2 | 5/2004 | Miloslavsky |
| 6,744,877 B1 * | 6/2004 | Edwards .................. 379/265.02 |
| 2003/0161463 A1 * | 8/2003 | Galvin ..................... 379/265.01 |

* cited by examiner

*Primary Examiner* — Antim Shah
(74) *Attorney, Agent, or Firm* — Husch Blackwell LLP

(57) ABSTRACT

In one embodiment, a method is provided for routing calls within an automatic contact distribution system comprising assessing at least two evaluators programmed to collect information about identified sets of attributes associated with a call. The system then initiates the collection of information to enable the evaluators to assign a value to those attributed for which information exists. A comparison is then performed of the values assigned to the attributes in each evaluator. The call is then routed to the agent selected by the comparison.

17 Claims, 1 Drawing Sheet

METHOD AND APPARATUS FOR CUSTOMER KEY ROUTING

FIELD OF THE INVENTION

The field of the invention relates generally to communication systems and more particularly to automatic call distributors.

BACKGROUND OF THE INVENTION

Systems which automatically distribute customer contacts or calls (generically referred to as "ACD") are often employed in telemarketing environments in which agents stationed at agent telephone sets answer many different types of telephone calls and other types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

ACDs may process inbound or outbound calls (i.e. customer contacts). Typically, a controller monitors the workload of the ACDs agents. When the workload of inbound calls fall below some threshold value, the controller may begin to initiate outbound calls, distributing outbound calls to agents based upon some criteria (e.g. idle time).

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the assigned agent that guides the agent through a sales presentation. DNIS information may be used to identify an intended call target and to select an appropriate sales presentation for use by the agent based upon the intended call target.

While automatic call distributors work relatively well, they are not particularly well suited to routing calls based upon multiple attributes or based upon attributes about multiple entities or resources associated with the call. Current routing capabilities are also not well suited to creating and utilizing user definable and expandable attribute lists to match the customer with an agent while further taking into consideration business and environmental attributes in a combinational fashion.

Current ACDs also typically do not allow routing based on the prioritization of multiple attributes or for creating dependencies between the attributes for the different entities or resources associated with the call. Accordingly, a need exists for a better method for creating and analyzing user definable and expandable attributes about multiple entities or resources associated with a call and then analyzing those attributes based upon priority and dependency criteria so as to route calls, whether incoming or outgoing, to an agent who is highly qualified to handle the call.

In this way the overall quality of the services provided by the company through its call in customer service can be improved. For example, calls can be not merely handled by a "repair" agent, but by an agent who specializes in repair of its equipment owned by the caller. Further, by the maintenance of databases containing updateable information about the business customer, the need for the customer to engage a digit selection process is reduced.

SUMMARY

Figure 1:
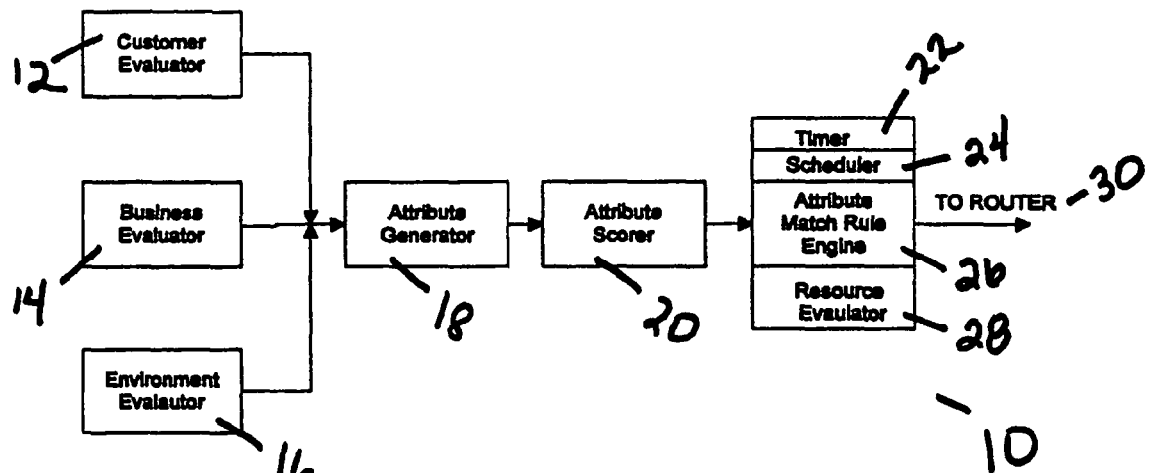
FIG. 1 is a functional block diagram illustrating one embodiment of a system for creating and comparing the profiles used to properly route incoming and outgoing calls.

In one embodiment, a method is provided for routing calls within an automatic contact distribution system comprising assessing at least two evaluators programmed to collect information about identified sets of attributes associated with a call. The system then initiates the collection of information to enable the evaluators to assign a value to those attributed for which information exists. A comparison is then performed of the values assigned to the attributes in each evaluator. The call is then routed to the agent selected by the comparison.

DETAILED DESCRIPTION

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

Various apparatus and method embodiments are described with reference to FIGS. 1 and 2 for routing incoming and outgoing calls utilizing multiple users defined and expandable attributes about multiple entities or resources associated with the call. These attributes may in some embodiments be divided into three groups—attributes concerning the customer (caller); attributes concerning the organization or business operating the ACD, including attributes regarding the agents; and attributes concerning the environment in which the ACD operates. These groups of attributes can be referred to as keys.

The attributes within the business and environmental keys may be compared with attributes in the caller's key to find matches indicating which agent is suited to handle the call.

Once the match is made, the call may then be routed to that agent. In another embodiment, agent selection may be made by comparison of the customer key with either of the business key or the environmental key.

The value for each attribute may be continually updated as additional or different information becomes available, thus allowing accurate, up to date keys for comparison of attributes for the caller and the business and as filtered through the attributes reflecting the current environmental resources available to handle the call.

A company's key performance indicators (KPI's) as well customer and/or agent preferences may be used to determine the attributes used and to attach priorities to certain attributes within each of these keys. For example, if the company strives to have a customer service department that provides the most technically qualified agent, even if it means slightly longer hold times, then attributes concerning the technical nature of the call (from the customer key) and the technical capabilities of the available agents (from the business key) and the technical resources available from the environmental key) may be ranked higher than information on hold times (from the environmental key). There may however be a maximum hold time after which time the call may be matched with an agent with a lower technical match score. One possible alternative is to create a maximum hold time attribute with a maximum hold time threshold value and to associate a high priority value to that attribute when the time the call is on hold or waiting in queue exceeds the maximum hold time threshold value.

Further, certain attributes by their very nature or by definition may be considered linked with other attributes or to be dependant upon certain other attributes. For example, if a call is place by video phone and a video phone response is requested, this attribute from the customer key may be linked to attributes in the environmental and business keys such that only agents with video phone capabilities are considered during the matching process.

In another alternative embodiment, if at the time a video phone call is received no agents with video phone capability are available, or waiting for such a match would exceed a pre-set maximum allowed hold time, then that attribute could be eliminated or ignored during the matching process. If the company does not place a priority on matching video phone calls with video phone agents as compared to other attributes, then this attribute either could not be measured or would not be given high priority or dependency value.

These various alternative methods provide the company with great flexibility in providing superior customer service in line with its KPI's, its customer's preferences and agent preferences.

FIG. 1 shows one embodiment of a system 10 for creating and comparing profiles. This system 10 includes three evaluators, a customer evaluator 12, a business evaluator 14 and an environmental evaluator 16. In one embodiment, each evaluator contains a preprogrammed set of attributes associated with the subject of each evaluator. The evaluators collect information about each of these attributes from various internal and external sources available and assign a value 32 to the attribute based upon that information. If there is no information on a particular attribute, then no value 32 is assigned.

The system 10 may be implemented in any suitable manner but typically including a combination of hardware and software. For example, the system 10 may comprise a digital processor (e.g. known microcomputers) either integral with or separate from the router, programmed to perform the functions illustrated in FIG. 1 and FIG. 2, and described herein.

The attributes within each evaluation may be user defined and expandable as more criteria are found to be relevant to the agent selection process.

Attributes may be chosen to tailor the agent selection process to help the company meet its KPI's or other business objectives. Attributes can also be chosen based upon customer or even agent preferences. The attributes selected may be different for different customers.

The customer evaluator 12 collects information about the customer to create the customer key. The information may be collected from information received from the call itself, such as the customer's identity based automatic number identification (ANI) information and/or from dialed number identification service (DNIS) to access any company files regarding past contacts with the customer and other information collected from the call itself, such as the nature of the call as determined from a digit or voice response selection process. The information available for establishing attributes values 32 may be updated after each customer contact.

In some embodiments, ANI may be used to identify a caller at the same instant as the call is delivered to the ACD. The controller of the ACD may use the ANI information to retrieve customer records that will supply the information for the customer evaluator 12. This same information may then be displayed on a terminal of the agent selected to handle the call at the same instant that the call is delivered to the agent.

Information to be collected in the customer evaluator 12 may include, for example: name, address, account ID, presence, location, equipment purchased, other equipment used; account history such as payments and prior purchases; profitability and the reason for the contact. There may also be attributes that record customer preferences and requirements for service call contacts. It is envisioned that many other possible attributes be associated as part of the customer evaluator. As more information is collected, the number of attributes with a value 32 may increase.

The information collected in the business evaluator 14 for the business key may include, for example, attributes relating to the agents themselves, such as their skill set and the functions they can perform such as repair or technical support. Agent attributes can also include agent preferences for certain types of calls or equipment they prefer to handle and the equipment available for a particular agent to use during a call. The business evaluator 14 may also include attributes relating to the company's current KPI's, strategic KPI goals, other business goals or objectives transactional cost information and transactional times. It is envisioned that many other possible attributes be associated as part of the business evaluator. The values 32 for these attributes are subject to change with each call as new information is collected by the evaluator 14.

In some embodiment, agent selection may occur by comparison of the customer key with only the business key.

A third evaluator that may also be used for the agent solution process is the environmental evaluator 16 which contains attributes about the resources available to handle the calls coming in to create the environmental key. The attributes in this evaluator could include, for example, available network bandwidth, data attack presence, the devices available to handle calls, information on the equipment such as presence and status, the type used, and its occupancy. There may also be attributes related to the system's 10 operational status and which agents are available to receive calls. It is envisioned that many other possible attributes be associated as part of the environmental evaluation. Agent attributes may be definable in the business or environmental evaluators 14, 16.

The values 32 for the attributes in the environmental evaluator 16 may, in some embodiments, change as calls are received, thus taking up bandwidth, equipment and other resources or as the number of callers falls off releasing more resources for use. Alternately, the attributes may change relative to the time of day or may change depending on the amount of resources within a computing or a data network.

In some embodiments, agent solution may occur by comparison of the customer key with only the environmental key.

Matches of callers to agents can in some embodiments be made based solely on the value 32 assigned to each attribute. For example a presence state value of an agent, as "available for voice calls" and a skill type value of "repair" are combinable to qualify an agent to handle a telephone transaction from a customer with a call type reason for contact attribute of "service call." These would be a high positive score for this type of transaction matching.

More complex matchings, still based only on attribute values 32, may occur when more attributes are considered. As an example assume there are two callers in queue with "repair" service calls: One, to repair a stove, and the second a refrigerator, and that there are three agents available, all with a skill type of "repair." This skill type may then be further defined so that agent one can repair only stoves, agent two can repair any home appliance and agent three only ovens. The match engine would match agent one with caller one; and, agent two with caller two. Agent two does not have a specialty for refrigerators, but is preferable to agent three who repairs ovens.

Alternately, it may be desirable to match a caller with a specific piece of equipment. For example, a piece of equipment that can record video phone calls may be a preferred recording device when a video phone inbound caller needs to leave a message more so than a piece of equipment that can only record the voice portion of the call. The video phone call recording equipment may therefore be selected over the equipment that records only the voice portion of the call.

In some embodiments, the values 32 for each attribute within each evaluator maybe written for each transaction as it occurs in an expandable XML format thus allowing for the values 32 for the attributes to be easily updated and for the assignment of values 32 to additional attributes as more or different information becomes available or is collected from the customer, business or about the environment. In other alternative embodiments, the values may be stored in a database record, a flat text file, a spreadsheet, a table within a computer memory, or other mechanism associative between the values and the attributes.

The attributes contributing to the final match may possibly take the following form with the first attribute showing an embedded XML form for each attribute:

```
<CUSTOMER>
    <ATTRIBUTE 1>
    </ATTRIBUTE 1>
    <ATTRIBUTE N>
    </ATTRIBUTE N>
</CUSTOMER>
<BUSINESS>
    <ATTRIBUTE 1>
    </ATTRIBUTE 1>
    <ATTRIBUTE N>
    </ATTRIBUTE N>
</BUSINESS>
<ENVIRONMENT>
    <ATTRIBUTE 1>
    </ATTRIBUTE 1>
    <ATTRIBUTE N>
    </ATTRIBUTE N>
</ENVIRONMENT>
```

In addition to assigning values 32 to each attribute, it is also contemplated in some embodiments that the attributes may be further defined as follows. Once the values 32 for the attributes have been collected an attribute profile is generated by the attribute generator 18. The attribute profile is then passed through the Attribute Scorer 20. As seen in FIG. 2, during the scoring process the attributes are assigned a priority 34, a weight 36 and any dependencies 38. These items for each attribute may be determined by, for example, the company's KPIs, by the nature of the attribute itself or by recorded customer or agent preferences.

For example, a particularly valuable customer has specified that it prefers that its calls be handled by video phone, even if it has to wait longer. If the customer evaluator 12 already contains an attribute that looks to see if the call is by video phone, then the value would be set to "yes" when the customer calls in on its video phone connection. In order to honor the customer's request for video phone response, that customer key would set a high priority 34 and weight 36 and perhaps have a dependency 38 created for this attribute. Likewise the priority and weight for hold time would be reduced. This allows the customer's request for a video phone response to be honored as often as possible, even if longer wait times are required.

If the customer evaluator does not have an attribute specifically for video phone, usage but has the capability of detecting this type of call, then a customer preference attribute could be created for this customer's key. This attribute would then collect information regarding the use of a video phone. It would also be linked to a high priority and weight and perhaps a dependency created to honor the customer request as often as possible. In both cases there may be a maximum hold time set after which the priority and weight given to the request for a video phone response is ignored or reduced so that the call can be handled by another agent.

For a customer who has specified that video calls are preferred, but also states they do not want to wait longer for them, then the same request—for video phone calls—would result in different weight, priority and dependencies being assigned to the attribute looking for video phone use. This would allow for more flexibility in the call matching process—a video phone match if readily available, but otherwise the next best match.

Figure 2:
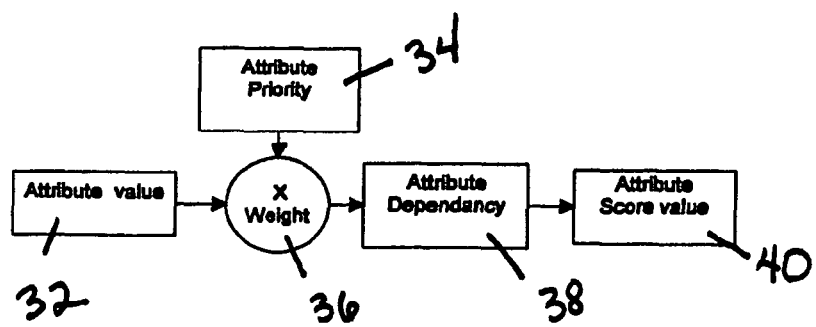
FIG. 2 is block diagram showing illustrating and embodiment of a model for the processing of the individual attributes in each profile.

The attribute values 32 collected in each evaluator may then be processed by the Attribute Scorer 20 utilizing their priority 34, weight 36 and dependencies 38 as shown in the model of FIG. 2. The attribute value 32 is associated with an attribute priority 34 and the weight 36 to be given to the attribute. This combination is then scanned for attribute dependencies 38 and a final attribute score value 40 is assigned.

For each attribute, that may include a priority 34, weight 36 or dependency 38 the following structure may be use to define the attribute by these features:

```
<ATTRIBUTE #>
    <Value>
        Value
    </Value>
    <Priority>
        Priority
    </Priority>
    <Weight>
        Weight
    </Weight>
```

-continued

```
<Dependency>
    Dependency
</Dependency>
</ATTRIBUTE #>
```

The attribute score values 40 for each evaluator make up the customer, business or environmental key. These keys are fed into the attribute matching engine 26 and the best matches are determined for the pool of callers and agents existing at that time. When multiple customers are being matched with multiple agents the matching engine 26 may not find the best agent match for each customer, but the best matches for the set of customers and agents.

The attribute matching engine 26 may take many forms to best align the attributes along three dimensions. The matching function may be implemented through a sequential rule based processor engine, web search servers or other forms of comparing the set of attributes of the customer key against the set of attributes for the business and environmental keys.

One such form would be a rule based router 30. If using a rule based router 30 it may be programmed to evaluate each and every attribute to calculate the extent of the match, or the closeness, of each of the three groups of attributes and allocate a score that is added to a total overall score for all of the other attributes comprising the matching function.

Another technique that may be used is that of selecting some of the attributes in a group, like the customer attributes, as being primarily and secondarily important to be matched against business and environment attributes. For example, if the customer has an attribute of having a SIP enabled phone on an inbound transaction, the allocation engine may be programmed to output a key code specifically requiring a SIP enabled business resource given sufficient environment resources.

Alternatively, mathematical models, for example a least mean squared approach, may be used in determining the closeness of particular attributes when the count of matching attributes are the same or to determine an overall score for all of the attributes. In this approach, the difference in the attribute value with the matched business and environment values may be calculated, squared and used as the perspective measure of how well the attributes align together.

Text or character based attributes may also be matched using known techniques. Matching exact words, their equivalents or matching text as being under the same subject (apples, oranges, pears all being equivalent to fruit) are all possible textual attribute matching strategies. More than one of these methods or other methods may be used at various times by the ACD.

If it is desired, then the system in one embodiment can assign an allocation cost function to each routing algorithm type in relation to the amount of bandwidth required to perform the matching function as a function of the number of transactions being processed. The timer 22 and scheduler 24 functions will determine available processing capabilities of the engine. The resource evaluator 28 will collect the timer 22 and scheduler 24 information along with the current availability of other resources to be used in the matching process. Different matching functions will require different bandwidths. As the number of current transactions increase, the amount of resources available diminishes requiring the choice of a matching algorithm that can complete the match using the available bandwidth in order to achieve a routing result. Certain matching algorithms may not use as many parameters for a loser match in order to require less resource bandwidth for determining the match. The resource allocation engine should determine the current bandwidth available in the matching engine before beginning the matching procedure in order to select the matching procedure that can be processed successfully under the current circumstances.

This method not only can be used to match callers with agents, but may also act to match an agent with the "best" caller from a group of callers in a queue. For example, when a queue of callers exists and one agent becomes available, rather than simply matching that agent with the next caller based upon time in the queue, this system 10 will send the company attribute key, which at this time will only have information on one agent, into the attribute matching engine with the environmental key and the customer keys for each of the customers in the queue. The agent will then be matched with the customer whose key is the best match for the agent available.

To avoid one customer spending an extraordinary amount of time in queue waiting for a match, the company key may include an attribute that looks for wait times over a threshold value. When that attribute is present, it would trump all others and allow that call to be handled by the next available agent.

Another way to reduce wait times for calls requiring special assistance would be to have an attribute that selects a group of all callers who have waited longer than a set amount of time and run them through the attribute matching engine ahead of other callers who have waited less than the set time. In this way callers will get matched to an agent better suited to handle the call than if simply assigned to the next available agent, yet will not be required to wait overlong for the smaller number of agents qualified to handle their call. Once the customer has been matched to an agent, the call may be routed to that agent together with any information needed to handle the call.

When the ACD controller initiates the assignment of outgoing calls, a queue of outgoing calls that need to be made is created and a customer key is created for each call in the queue. This queue of calls is then processed as described above and a match made to an agent. The call is initiated by the ACD and routed to selected agent. The agent receives the call and any information needed to handle the call.

A specific embodiment of method and apparatus for distributing calls has been described for the purpose of illustrating the manner in which a possible embodiment of the invention is made and used. It should be understood that the implementation of other variations and modifications of a possible embodiments of the invention and its various aspects will be apparent to one skilled in the art, and that a possible embodiment of the invention is not limited by the specific embodiments described. Therefore, it is contemplated to cover all possible embodiments of the invention and any and all modifications, variations, or equivalents that fall within the true spirit and scope of the basic underlying principles disclosed and claimed herein.

The invention claimed is:

1. A method for routing calls within an automatic contact distribution system (ACD) that comprises the steps of:
   accessing at least three different evaluators programmed to collect information for an associated call about at least three different respective identified sets of attributes including a customer evaluator defined by customer information, said customer evaluator programmed to collect customer information about an identified set of customer attributes relating to customers for at least some of the customers originating calls in to the ACD, a business evaluator defined by attributes of agents of the ACD, said business evaluator programmed to collect information about an identified set of business attributes relating to agents and to a business receiving calls on the ACD, and an environment evaluator defined by available equipment resources of the ACD, wherein equipment resources do not include agent availability and agent attribute said environmental evaluator programmed to collect information about an identified set of environmental attributes reflecting equipment resources available to handle calls on the ACD;

initiating for the associated call the collection of information enabling said evaluators to assign a value to those attributes for which information exists;

creating for the associated call a customer attribute score value based upon the collected customer attribute values, a business attribute score value based upon the business attribute values, and an environment attribute score value based upon the environmental attribute values;

performing a comparison of the customer attribute score value to the business attribute score value and the environment attribute score value using a selected one of a plurality of attribute matching algorithms for matching the attribute score values to select an agent where the selected algorithm is chosen based on resources bandwidth available to determine the match, and routing said call to the agent selected by said comparison.

2. The method of routing calls as in claim 1 further comprising collecting timing, and available processing capabilities of a match engine and, when available resources diminish, choosing the matching algorithm which uses less parameters for a looser match in order to require less resource bandwidth to determine the looser match and achieve a routing result.

3. The method of routing calls as in claim 2 wherein said customer evaluator collects information available about the customer and the customer's account from internal and external sources and from the customer after the call is received by the ACD and wherein the attribute values are updated after each customer contact.

4. The method of routing calls as in claim 2, wherein one or more of the following occurs:
    at least one of said customer attributes programmed into the customer evaluator are assigned a priority ranking in relationship to the other customer attributes;
    at least one of said customer attributes programmed into said customer evaluator is assigned a weighted value; and
    at least one of said customer attributes are assigned a dependency so that said dependant customer attributes can be linked as necessary to certain business or environmental attributes during said comparisons.

5. The method of routing calls as in claim 2, wherein one of more of the following occurs:
    at least one of said business attributes programmed into the business evaluator is assigned a priority ranking in relationship to the other business attributes;
    at least one of said business attributes programmed into said business evaluator is also assigned a weighted value;
    at least one of said business attributes are assigned a dependency so that said dependent business attribute can be linked as necessary to certain customer or environment attributes during said comparison.

6. The method of routing calls as in claim 2, wherein one or more of the following occurs:
    at least one of said environmental attributes programmed into said environmental evaluator is assigned a priority ranking in relationship to the other environmental attributes;
    at least one of said environmental attributes programmed into said environmental evaluator is assigned a weighted value;
    at least one of said environmental attributes is assigned a dependency so that said dependent environmental attribute can be linked as necessary to certain customer or business attributes during said comparison.

7. The method of routing calls within an automatic call distributor as in claim 2 wherein:
    at least one of said customer attributes programmed into the customer evaluator may be assigned a priority ranking in relationship to the other customer attributes;
    at least one of said attributes programmed into said customer evaluator may be assigned a weighted value;
    at least one of said customer attributes may be assigned a dependency so that said customer attribute can be linked as necessary to certain business or environment attributes during said comparison;
    at least one of said business attributes programmed into the business evaluator may be assigned a priority ranking in relationship to the other business attributes;
    at least one of said business attributes programmed into said business evaluator is assigned a weighted value;
    at least one of said business attributes may be assigned a dependency so that said business attribute can be linked as necessary to certain customer or environmental attributes during said comparison;
    at least one of said environmental attributes programmed into the environmental evaluator may be assigned a priority ranking in relationship to the other environmental attributes;
    at least one of said environmental attributes programmed into said environmental evaluator is assigned a weighted value;
    at least one of said environmental attributes may be assigned a dependency so that said environmental attribute can be linked as necessary to certain customer or business attributes during said comparison.

8. The method of routing calls as in claim 2 wherein said comparison is made by evaluating the values assigned to the various customer, business and environmental attributes to locate compatible customer/agent/equipment matches.

9. The method of routing calls as in claim 7 wherein said comparison is made by evaluating the values assigned to the various customer, business and environmental attributes together with any priorities, weights and dependencies to locate compatible customer/agent/equipment matches.

10. The method of routing calls as in claim 2 or 7 wherein said comparison is made by an attribute matching engine that makes comparisons of the values assigned to the various customer, business and environmental attributes and any priorities, weights and dependencies associated with an attribute to locate compatible customer/agent/equipment matches.

11. The method of routing calls as in claim 2 or 7 wherein the attributes within one evaluator are given the highest priority during said comparison.

12. The method of routing calls within an automatic call distributor as in claim 2 or 7 wherein the selected matching algorithm uses less attributes and a more loose match to reduce required resource bandwidth when current routing load increases beyond current capacity.

13. An apparatus for routing calls within an automatic contact distribution system (ACD) comprising:
- means for collecting customer information for an associated call about a preprogrammed set of customer attributes for use by a customer evaluator, said customer evaluator defined by customer information;
- means for collecting information about a preprogrammed set of business attributes relating to a business receiving the associated call on the ACD for use by a business evaluator, said business evaluator defined by attributes of agents of the ACD;
- means for collecting information about a preprogrammed set of environmental attributes reflecting equipment resources available to handle calls for use by an environment evaluator, said environmental evaluator defined by available equipment resources of the ACD wherein equipment resources do not include agent attributes and agent availability;
- means for assigning a priority as required to said attributes within each evaluator;
- means for giving a weighted value to at least one of said attributes within each evaluator;
- means for assigning dependencies to certain attributes within each evaluator;
- means for creating for the associated call a customer attribute score value based upon the customer attributes, priority, weighted value and dependencies, for creating a business attribute score value based upon the attribute, priority, weighted value, and dependencies, and for creating an environment attribute score value based upon the attribute, priority, weighted value, and dependencies; and
- means for comparing for the associated call, the customer attribute score value to the business attribute score value and the environment attribute score value using a selected attribute matching algorithm for matching the attribute score values, the algorithm selected to use less attributes to form a more loose matching of the attribute scores in response to an increase in current transactions, to match a customer with a compatible available agent;
- means for routing said call to the agent selected by the comparison.

14. An apparatus for routing calls as set forth in claim 13 further comprising:
- means for determining available processing capabilities of a match engine for said comparison and for choosing the matching algorithm based upon the available match engine processing capabilities and current transaction load.

15. An apparatus for routing calls within an automatic contact distribution system (ACD) comprising:
- at least one digital processor programmed to: collect for an associated call information about a preprogrammed set of customer attributes for storage in at least a customer evaluator, where the customer evaluator is defined by customer information, and collect information about a set of business attributes relating to a business receiving the associated call for at least one business evaluator, where the business evaluator is defined by attributes of agents, and collect information about a set of environment attributes reflecting environmental resources available to handle calls for an environmental evaluator, where the environmental evaluator is defined by available equipment resources of the ACD which do not include agent availability; assign values to the attributes for which information is available; assign a priority as required to said attributes in said evaluators; assign a weighted value as required to said attributes in said evaluators; assign dependencies as required to certain attributes within each evaluator; compare the values of any customer attributes including any assigned priority, dependencies, or weighted values against the business and environment attribute values together with any assigned priorities, weighted values or dependencies using a selected attribute matching algorithm, selected from a plurality of matching algorithms for matching the attributes, to match a customer with a compatible available agent; and then rout the call to said agent.

16. An apparatus as set forth in claim 15 further comprising an attribute matching engine programmed to compare the values assigned to the attributes within the customer evaluator together with the priorities, weighted values and dependencies to the attribute values, priority, weighted values and dependencies within at least the business and environment evaluators to match a customer with a compatible available agent and wherein the selected matching algorithm compares less attribute values and performs a more loose match to reduce required resource bandwidth when current routing load increases beyond current capacity.

17. The apparatus of claim 16 further comprising a digital processor programmed to determine matching engine processing capabilities available for said comparison and to select the attribute matching algorithm based upon the matching processing capabilities available and current transaction load.

* * * * *